(12) United States Patent
Arai

(10) Patent No.: US 7,837,915 B2
(45) Date of Patent: Nov. 23, 2010

(54) INJECTION MOLDING PROCESS, RESIN MOLDED PRODUCT AND MOLD

(75) Inventor: Takashi Arai, Ryugasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 12/441,297

(22) PCT Filed: Oct. 25, 2007

(86) PCT No.: PCT/JP2007/071273

§ 371 (c)(1),
(2), (4) Date: Mar. 13, 2009

(87) PCT Pub. No.: WO2008/053946

PCT Pub. Date: May 8, 2008

(65) Prior Publication Data

US 2010/0047500 A1   Feb. 25, 2010

(30) Foreign Application Priority Data

Nov. 1, 2006   (JP)   ............... 2006-297643

(51) Int. Cl.
*B29C 45/00*   (2006.01)
(52) U.S. Cl. .................... 264/161; 264/328.9; 264/336; 425/553; 425/554
(58) Field of Classification Search ............... 264/161, 264/328.9, 336; 425/553, 554
See application file for complete search history.

(56) References Cited

U.S. PATENT DOCUMENTS 4,752,199 A   6/1988   Arai ........................ 425/130

5,269,978 A   12/1993   Umetsu et al. ............... 264/1.4

(Continued)

FOREIGN PATENT DOCUMENTS

JP   61-94733   5/1986

(Continued)

OTHER PUBLICATIONS

International Search Report and Written Opinion in PCT/JP2007/071273.

(Continued)

*Primary Examiner*—Joseph S Del Sole
*Assistant Examiner*—James Sanders
(74) *Attorney, Agent, or Firm*—Fitzpatrick, Cella, Harper & Scinto

(57) ABSTRACT

The invention provides an injection molding process, in which a gate is cut off within a mold in resin molding to obtain a good gate-cut surface, as well as a resin molded product and a resin molding mold. In the injection molding process, a cutting pin, which is connected to a cutting pin working plate provided in parallel with a driving device or an ejector plate provided in a mold, slides on a mold parting line between a fixed-side block, on which corner cutting or a R shape is provided at the approach port, and a movable-side block opposed to the fixed-side block. The wall thickness of a compression shape portion opposed to the cutting pin is larger than that of a gate and a product shape portion. The cutting pin compresses a resin in this portion toward the product shape portion at predetermined timing to cut off the gate portion and integrate the resin with the product shape.

12 Claims, 16 Drawing Sheets

U.S. PATENT DOCUMENTS

| | | | |
|---|---|---|---|
| 6,676,401 B2 | 1/2004 | Saito et al. | 425/563 |
| 7,083,403 B2 | 8/2006 | Arai | 425/4 |
| 7,114,946 B2 | 10/2006 | Mizuta et al. | 425/542 |
| 2007/0031533 A1* | 2/2007 | Shigesada et al. | 425/556 |
| 2008/0185747 A1 | 8/2008 | Uezaki et al. | 264/40.5 |

FOREIGN PATENT DOCUMENTS

| | | |
|---|---|---|
| JP | 7-80894 | 3/1995 |
| JP | 9-174621 | 7/1997 |
| JP | 9-277321 | 10/1997 |
| JP | 3041975 | 3/2000 |
| JP | 2000-108180 | 4/2000 |
| JP | 3178659 | 4/2001 |
| JP | 3207784 | 7/2001 |

OTHER PUBLICATIONS

Notification Concerning Transmittal of International Preliminary Report on Patentability dated May 14, 2009, in related corresponding International Appln. No. PCT/JP2007/071273.

* cited by examiner

INJECTION MOLDING PROCESS, RESIN MOLDED PRODUCT AND MOLD

TECHNICAL FIELD

The present invention relates to an injection molding process in which a resin material is melted, injected into a mold worked into a desired shape, cooled and solidified, and a molded product is then taken out of the mold, as well as a resin molded product and a mold.

BACKGROUND ART

A process in which a molten resin material is injected into a mold worked into a desired shape in advance and cooled and solidified in the mold, and the mold is then opened to take a molded product out of the mold, has been widely known as an injection molding process and utilized. A product shape portion for a molded product having a product function and an ingate (nozzle portion) of a molding machine for injecting a molten resin into a mold are generally connected through such portions as to be called a sprue, a runner and a gate. FIG. 23 illustrates a side-gate mold generally used. The mold includes an injection port 48 of a nozzle part, a gate 51, a runner 52, a sprue 53, a product shape portion 49 and an ejector 50. With the generally used side gate type mold illustrated in FIG. 23, the product shape portion, gate, runner and sprue are taken out of the mold by the ejector as one piece. Since these sprue, runner and gate portions have no product function and are unnecessary portions, these portions are discarded or reused by remelting or the like after being cut off from the product shape portion after molding. However, it takes a labor cost since a worker cuts off the gate portion using a cutting tool such as nippers after the sprue and runner portions are taken out of the mold. In addition, an automatic machine for cutting has involved a cost problem such as an increase in part cost due to the cost of the automatic machine. In order to solve these problems, a pin-gate method, in which a gate portion is formed in the shape of a small pin, and the gate is automatically cut off upon mold opening in removal of a molded product from a mold, is used. According to the pin-gate method, a gate can be cut without using a worker, and an exclusive machine is also unnecessary, so that such method can be widely used for small parts. In the pin-gate method, however, the mold is in the form called a three-plate mold, so that the pin-gate method has involved such problems as complication of the mold structure, increase in molding cycle and material cost due to increase in runner volume, and increase in mold thickness. As a method for solving the problem of the pin gate method, a hot-runner method, which requires neither a sprue nor a runner, has been proposed and put into practical use. According to the hot-runner method, a product is molded directly or by using a very small runner, so that a discarded material is very small. Further, a direct gate type in which a gate of a hot runner is directly provided on a product has the merit not only that no scrap material is produced but also that cutting of the gate is unnecessary. However, it is often difficult from the viewpoints of product function and design to directly provide the gate on the product shape portion, and moreover there arise such problems not only that increase in mold cost is brought because the hot runner itself is expensive but also that maintenance is hard because the mold structure is complicated.

As a method for solving the above-described problems, a method called an in-mold gate cutting method, in which a function of cutting a gate is provided in a mold, has been proposed in addition to a method called a side-gate method, in which the mold structure is very simple. JP Patent Registration No. 3041975 discloses that a gate cutting pin having a slope surface in a direction of a runner is provided, and the pin is moved in a direction perpendicular to the runner, thereby causing a resin in a gate portion to flow backward in the direction of the runner to cut off a product shape portion from the gate portion. JP Patent Registration No. 3178659 and JP Patent Registration No. 3207784 disclose an in-mold gate cutting method for a disc gate, which is employed for CDs, optical discs and DVD discs. According to these methods, a sprue cutting punch having a movable cutter and a cut hole, into which the end portion of the sprue cutting punch can be advanced upon operation thereof, are provided on the core side and the cavity side of the disc gate, respectively, whereby the disc gate is cut in the mold. JP Patent Application Laid-Open No. H09-174621 discloses a method in which a gate cutting pin having a slope surface provided on the side of a product is operated to push a resin in a gate portion toward the product, and a gate is cut off at the same time. U.S. Pat. No. 6,676,401 discloses a gate cutting pin operating unit provided in a mold and a gate-cutting pin with a slope surface provided on the side of a runner, in which the position of a cutting pin after cutting a gate comes into contact with both cavity and runner.

However, a high pressure of 20 Mpa to 80 Mpa, which is called a holing pressure after filling a resin, is generally applied to the runner for preventing defects such as sink marks, which occur at the product shape portion. In these conventional molds and methods, it is very difficult, for the method in which the slope surface is provided on the gate cutting pin and thus the gate cutting pin causes the resin in the gate portion to flow backward to the side of the runner, to return the resin to the side of the runner by the slope surface of the gate cutting pin before or just after completion of the pressure holding. There has also been the need of enlarging the size of the runner for returning the resin to the runner side and of slowing the cooling and solidification of the resin. However, the enlargement of the runner size has involved problems that a molding cycle is elongated because the runner cooling time is long and that a scrap material is increased by an amount corresponding to the enlargement. In order to prevent the resin from flowing backward during cooling after a sufficient pressure is applied to the product shape portion, it is an ordinary way that the mold is generally designed in such a manner that the thickness of the gate is made thinner than the thickness of a product to cool and solidify the gate portion faster than the product. However, it is necessary to conduct the cutting of the gate by the gate cutting pin before the gate is solidified, so that there arises such a problem of trade-off between the pressure holding and the timing of the gate cutting that a sufficient pressure cannot be applied to the product shape portion. In addition, when the thickness of the gate is made greater than the product shape portion, a problem that flash is produced on a gate-cutting surface on the side of the product has arisen in addition to the problems that the molding cycle is elongated and the scrap material is increased, like the case where the runner is enlarged. In general, for all the conventional methods, since a working surface of the gate cutting is a part of a product surface and becomes a sliding surface of the cutting pin, scuff marks and discontinuous irregularities occur in a part of the product surface. Thus they involve such defects that it is difficult to retain the product surface quality at the gate equivalent to that of the product surface around the gate.

DISCLOSURE OF THE INVENTION

As a means for solving the above-described problems, an injection molding process according to the present invention is an injection molding process using a resin molding mold having a product shape portion and a gate portion for filling a resin into the product shape portion, which comprises the steps of providing a cutting pin which works in a direction of the product shape portion and a compression shape portion between the cutting pin and the product shape portion, the compression shape portion adjoining the gate portion and having a larger wall thickness than the gate portion, performing an injecting step of filling a resin into the compression shape portion and the product shape portion from the gate portion followed by solidification of the resin at the gate portion, and cutting off the resin at the compression shape portion from the gate portion by operation of the cutting pin and transferring the resin at the compression shape portion to the product shape portion to integrate the resin with the product shape portion.

A resin molded product according to the present invention is molded by the injection molding process.

A resin molding mold according to the present invention comprises a product shape portion, a gate portion, a cutting pin which works in a direction of the product shape portion and a compression shape portion provided between the cutting pin and the product shape portion, the compression shape portion adjoining the gate portion and having a larger wall thickness than the gate portion, wherein the product shape portion includes a part shape portion and a compression-purpose thick portion, the compression-purpose thick portion having a larger wall thickness than the part shape portion and becoming engaged with the end portion of the cutting pin by the working of the cutting pin.

According to the present invention, the compression shape portion having a larger wall thickness than the gate portion is provided, so that the resin at the gate is cooled and solidified upon cutting of the gate not to cause backward flow of the resin toward the runner, and besides the appearance of the resulting part is not deteriorated by cutting because no cut surface is present at the product shape portion. Since a cut portion can be made into a shape continuing from the product shape portion, productivity is high in the production of a wide variety of resin molded products, and molded products high in appearance quality can be obtained.

Further features of the present invention will become apparent from the following description of exemplary embodiments with reference to the attached drawings.

BEST MODE FOR CARRYING OUT THE INVENTION

The construction and operation of a resin molding mold according to the present invention will be described with reference to the drawings.

Figure 1:
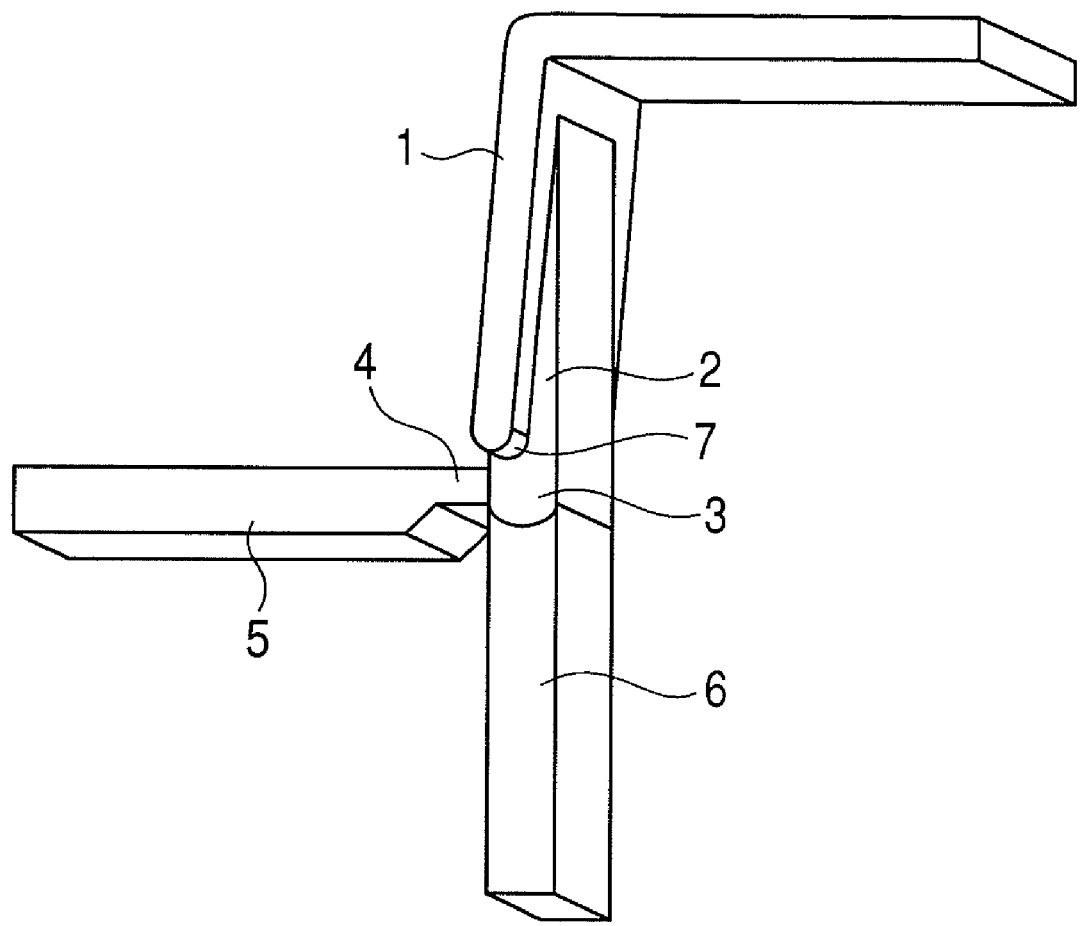
FIG. 1 illustrates a fundamental constitution of the present invention.
Figure 2:
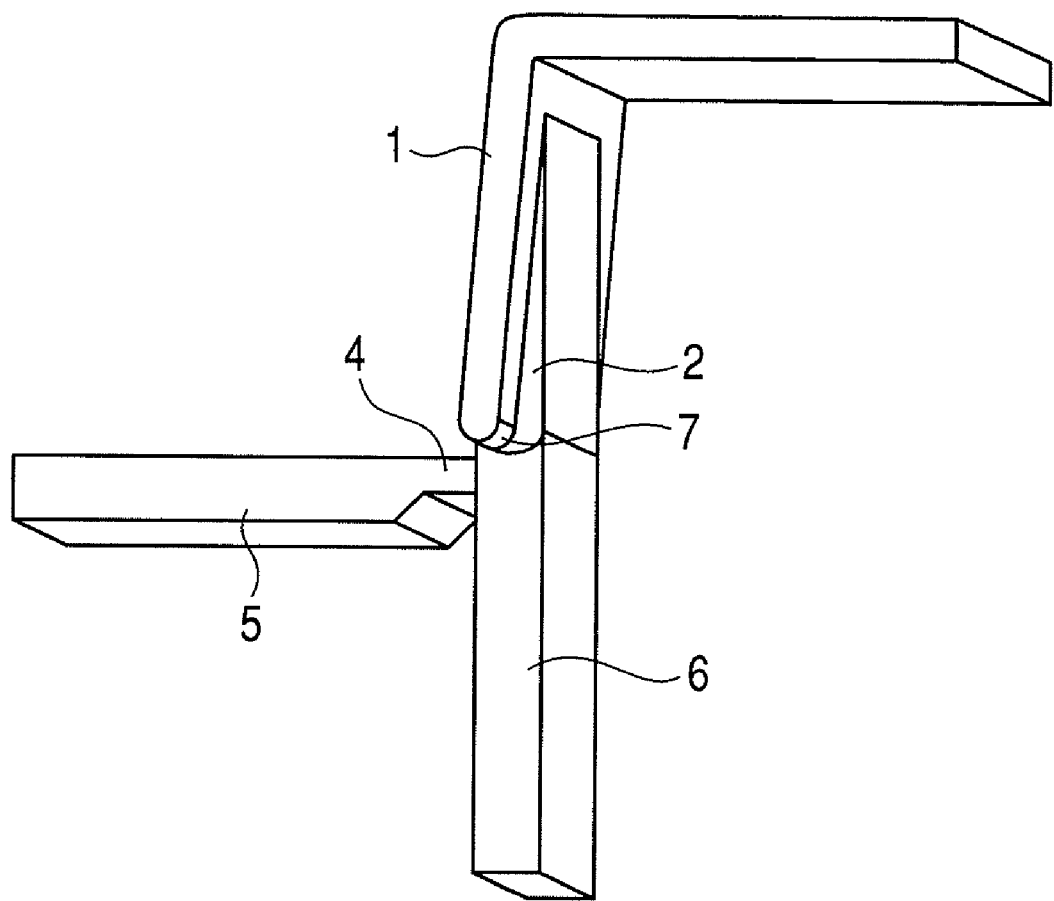
FIG. 2 illustrates a condition just after a gate has been cut off in the present invention.

FIG. 1 illustrates an exemplary embodiment showing the fundamental constitution of the present invention and is a schematic view in the vicinity of a gate just after a resin is filled into a mold. In FIG. 1, are illustrated a part shape portion 1, a compression-purpose thick portion 2 which is opposed to a cutting pin 6 and has a larger wall thickness than the surrounding part shape portion 1, a compression shape portion 3, a gate portion 4 having a gate at the end thereof, a runner portion 5, a pin- or block-shaped cutting pin 6, and a product end surface 7. The parts shape portion 1 and the compression-purpose thick portion 2 construct a product shape portion, which has a shape to become a product. FIG. 2 illustrates a state just after the gate has been cut off in the present invention.

Figure 3:
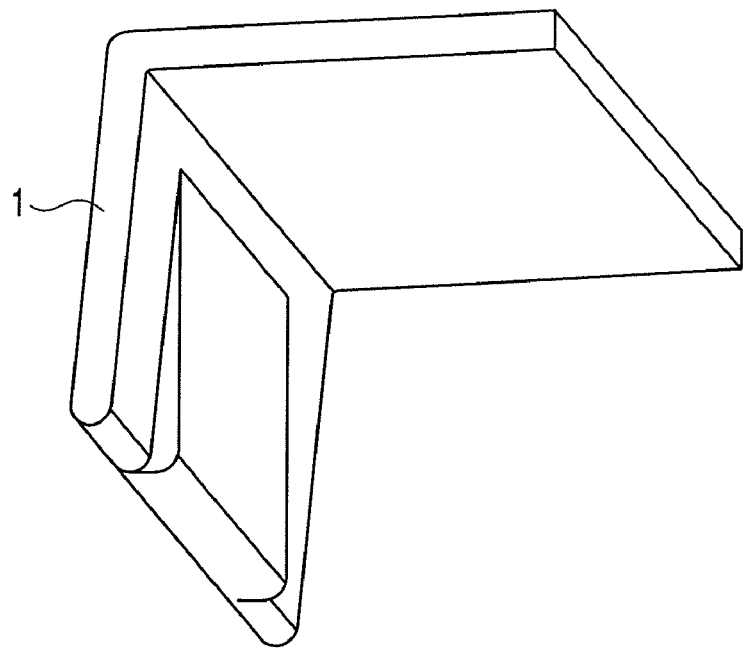
FIG. 3 illustrates a shape of a molded product just after the gate has been cut off.
Figure 4:
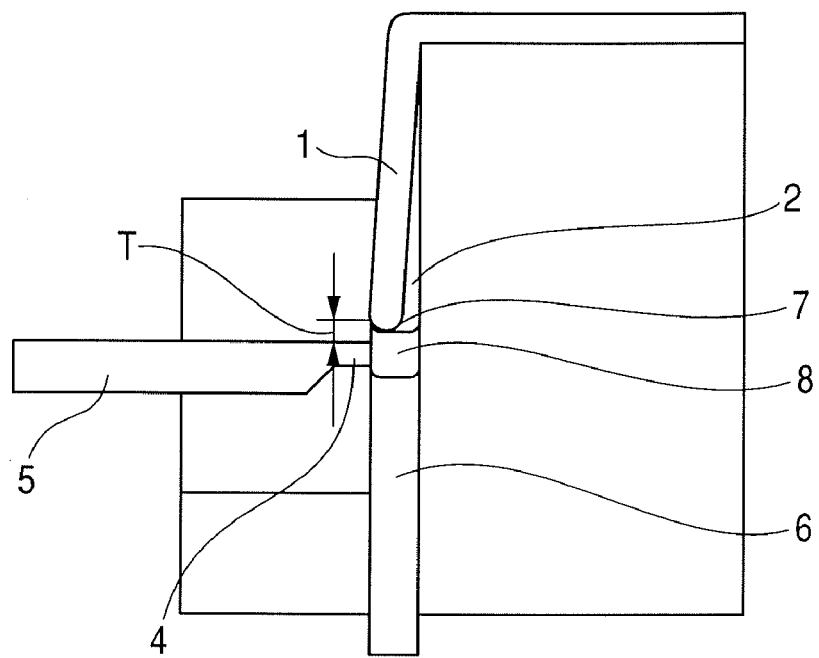
FIG. 4 is a cross-sectional view of the interior of a mold after a cutting pin 6 is returned to an original position after the cutting of the gate.

Operation will now be described with reference to FIG. 1 and FIG. 2. The compression shape portion 3 having a larger wall thickness than the gate portion 4 is provided between the cutting pin 6 and the product shape portion. The compression shape portion 3 adjoins the gate portion 4 to fill a resin into the cavity of a mold. The cavity of the mold is comprised of the part shape portion 1, the compression-purpose thick portion 2 and the compression shape portion 3. FIG. 1 illustrates a condition just after the resin has been filled into the product shape portion and the compression shape portion, and the next pressure holding step follows. The cooling and solidification at the gate portion 4 having the smallest wall thickness is fastest. Since a holding pressure cannot reach the product shape portion at the time the solidification at the gate portion has been completed, the pressure holding step is completed. The solidification means a state where a resin does not move even when a pressure is applied. After completion of the pressure holding step, the cutting pin 6 starts to rise while compressing the compression shape portion 3 at a predetermined speed and with a proper pressure. Since the solidification at the gate portion 4 has been already completed at this time, backward flow of the resin to the side of the gate does not occur, so that the internal pressure of the resin in the product shape portion only undergoes pressure drop caused by shrinkage attending on cooling of the product shape portion. Since the compression shape portion 3 is connected to the compression-purpose thick portion 2 and has a larger wall thickness than the gate portion 4 and the part shape portion 1, the resin remains soft after the resin in the gate portion 4 is solidified. Even in a gate cutting surface, a boundary surface linking to the compression shape portion 3 receives heat transmitted from the compression shape portion 3, so that the resin present in this portion has such a softness that it can be cut. Accordingly, the resin in the compression shape portion 3 is easily transferred to the compression-purpose thick portion 2 as the cutting pin 6 rises, so as to be integrated with the product shape. The moving quantity of the cutting pin is controlled by ejector operation control of an injection molding machine or by such a control mechanism as a limit of a hydraulic cylinder and a stopper provided in the mold. Therefore, the cutting pin is stopped at the position of a product end surface 7 illustrated in FIG. 2, and the compression-purpose thick portion is engaged with the end portion of the cutting pin to form the product shape portion. After a predetermined cooling time has elapsed, the cutting pin 6 is receded to the original position. A molded product molded in the product shape portion is illustrated in FIG. 3. FIG. 4 is a cross-sectional view of the interior of the mold after the cutting pin 6 is returned to the original position after the cutting of the gate. In FIG. 4, the product end surface 7 is the same surface as the end surface of the compression-purpose thick portion 2, and the compression shape portion becomes a hollow 8 by operation of the cutting pin 6. The cutting pin 6 is so constructed that a portion indicated by T is entered into the fixed side. The stroke value T is adequately determined in relation with the R dimension of a fixed-side gate insert core, which will be described later. However, the value is favorably of the order of R0.5 mm to R2.0 mm. When the whole cooling time is completed, the mold is opened, and the gate portion 4 and the product shape portion comprised of the part shape portion 1 and the compression-purpose thick portion 2 are taken out in a respectively cut-off condition to remove a molded product which is a product shape portion including no compression shape portion 3.

Figure 5:
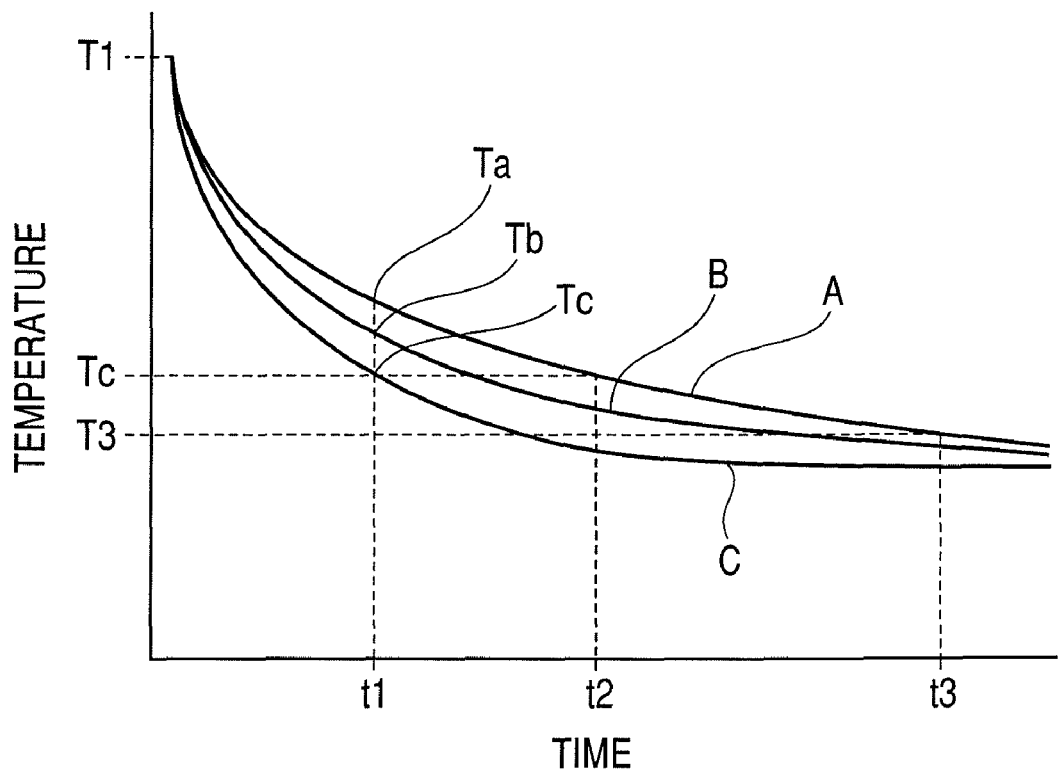
FIG. 5 illustrates temperature changes with the passage of time.

The temperature changes of the part shape portion 1, the compression-purpose thick portion 2 according to the present invention and the gate portion 4 with the passage of time will now be described with reference to FIG. 5. In FIG. 5, the axis of ordinate and the axis of abscissa indicate temperature and time, respectively, and a curve A, a curve B and a curve C indicate temperatures of the compression-purpose thick portion 2, the part shape portion 1 and the gate portion 4, respectively. T1 indicates the resin temperature. When the resin is filled into the mold, the resin is cooled by the mold to start solidifying. The resin having a resin temperature T1 is cooled with time through the respective loci of A, B and C. A temperature at which the resin is solidified and does not move (flow) even when a pressure is applied is referred to as no-flow temperature, and t1 is the time at which the gate portion has reached the no-flow temperature Tc. At this time, the gate portion is at the no-flow temperature, whereas A and B, for which the wall thicknesses are larger than that of the gate portion, are at flowable temperatures Ta and Tb. At the time t2 at which A with the largest wall thickness and thus with the highest temperature has reached the no-flow temperature, the resin of B was already solidified. Accordingly, the gate cutting and compression operation in the present invention are conducted between the times t1 and t2. At this time, the temperature of the gate portion indicated by C is a temperature not higher than the no-flow temperature, so that the resin at the gate portion is prevented from flowing backward. Also the resin at the compression-purpose thick portion, which is a feature of the present invention, is flowable and soft, so that the cutting and compression can be easily conducted. The pressure holding step is generally conducted at a time not later than t1 at which the gate portion has been cooled, and the cooling is conducted up to a removal temperature T3 not higher than the heat distortion temperature HDT of the resin.

Figure 6:
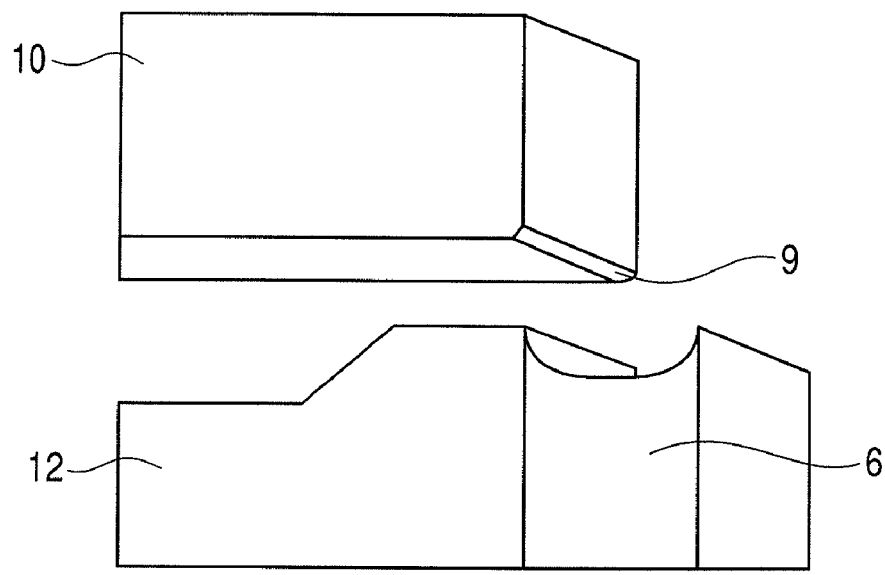
FIG. 6 illustrates the structure of a mold.
Figure 8:
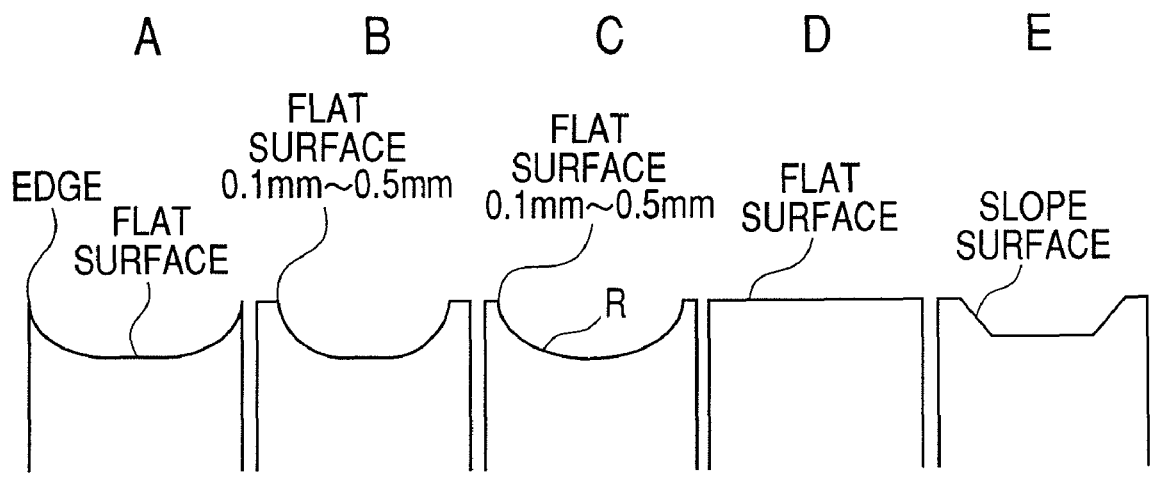
FIG. 8 illustrates end shapes of cutting pins.

A part of a mold structure, which is a second feature of the present invention, will now be described with reference to FIG. 6. In FIG. 6, are illustrated a gate insert core 10 on the fixed side and a gate insert core 12 on the movable side. In the fixed-side gate insert core, an R shape 9, which is the second feature of the present invention, is provided at an approach port portion with which the cutting pin 6 comes into contact upon its working. The R shape illustrated in FIG. 6 generally has an R value of 0.1 mm to 0.5 mm though an adequate value is determined according to the stroke of the cutting pin 6 and the wall thickness of a part. In an Example of the present invention, the resin material was PC/ABS, the basic wall thickness of a product was 2.0 mm, the thickness of the gate was 1.5 mm, the working stroke of the gate cutting pin was 2.5 mm, the R of the fixed-side gate insert core was 0.3 mm, and the repeating gate cutting durability number was greater than 100,000. Other Examples are shown in Table 1. The end shapes of cutting pins used at that time are illustrated in FIG. 8. The end shape of the cutting pin may be a flat surface, a curved surface or a combined shape thereof.

TABLE 1

|  | Ex. 1 | Ex. 2 | Ex. 3 | Ex. 4 | Ex. 5 | Ex. 6 |
| --- | --- | --- | --- | --- | --- | --- |
| Resin material | PC/ABS | PC/ABS | PC/ABS | ABS | ABS | HIPS |
| Product wall thickness | 2.0 mm | 2.3 | 2.1 | 2.1 | 1.8 | 1.5 |
| Gate thickness | 1.5 mm | 1.5 | 1.3 | 1.3 | 1.2 | 1 |
| Runner thickness | 5.0 mm | 5 | 5 | 4 | 4 | 4 |
| Thickness of compression- | 3.0 mm | 2.8 | 2.5 | 2.5 | 2.3 | 2 |

TABLE 1-continued

|  | | | | | | |
|---|---|---|---|---|---|---|
| purpose thick portion | | | | | | |
| Shape of cutting pin | A | B | C | D | A | B |
| Stroke of cutting pin | 2.5 mm | 2.5 | 2.3 | 2.3 | 2.2 | 2 |
| R of gate insert core | 0.3 mm | 0.3 | 0.1 | 0.2 | 0.1 | 0.2 |
| Durability number | >100,000 | >100,000 | >100,000 | >100,000 | >100,000 | >100,000 |

|  | Ex. 7 | Ex. 8 | Ex. 9 | Ex. 10 | Ex. 11 |
|---|---|---|---|---|---|
| Resin material | HIPS | PPO/PS | PPE/PS | PC + GF20 | PPE/PS + GF20 |
| Product wall thickness | 2 | 2 | 2.5 | 2 | 2.5 |
| Gate thickness | 1 | 1.2 | 1.5 | 1 | 1.5 |
| Runner thickness | 4 | 5 | 5 | 6 | 6 |
| Thickness of compression-purpose thickness portion | 2.5 | 2.5 | 3 | 3 | 3.2 |
| Shape of cutting pin | D | A | B | D | E |
| Stroke of cutting pin | 2 | 2.2 | 2.5 | 2 | 2.5 |
| R of gate insert core | 0.2 | 0.2 | 0.3 | 0.5 | 0.5 |
| Durability number | >100,000 | >100,000 | >100,000 | >80,000 | >80,000 |

Figure 7:
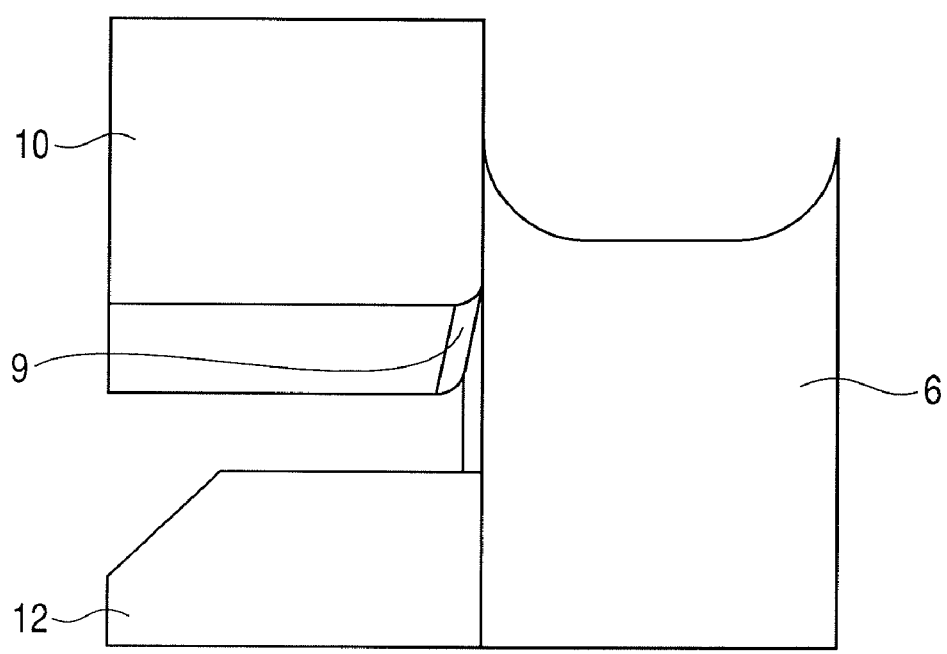
FIG. 7 illustrates a condition just after the cutting pin has been worked.

FIG. 7 illustrates a condition just after the cutting pin has been worked, and the penetration of the cutting pin into the fixed-side gate insert core can be smoothly conducted by virtue of the R shape 9. If no R shape is present on the other hand, the cutting pin interferes with the edge of the fixed-side gate insert core, and so the cutting pin is easily broken. Since the fixed-side gate insert core and the movable-side gate insert core containing the cutting pin according to the present invention are so constructed that the pieces are mutually fitted and positioned, the relative position between both pieces and the cutting pin is always fixed. In addition, since the clearance for sliding at the sliding portion between the fixed-side gate insert core and the cutting pin is 10 microns or less, it is prevented that the resin enters between the cutting pin and the fixed-side gate insert core after cutting and causes flash.

Figure 9:
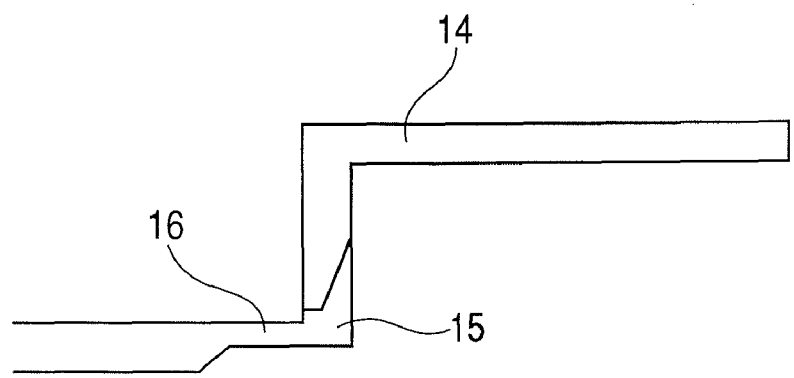
FIG. 9 illustrates an embodiment in which the present invention was applied to a portion where an end surface of a part is tapered.

FIG. 9 illustrates an embodiment in which the present invention was applied to a portion where an end surface of a product is tapered. This embodiment is an Example where the present invention was used for a resin molded product used in, for example, cases for printers, copying machines, facsimiles, scanners and combined machines thereof. A part shape portion 14, a compression shape portion 15 and a gate portion 16 are illustrated. The compression shape portion 15 is provided, and a cutting pin cuts off the gate portion 16 while compressing the compression shape portion 15. As described above, the compression shape portion 15 has a larger wall thickness than the part tapered portion and the gate portion, so that the cutting pin was smoothly operated.

Figure 10:
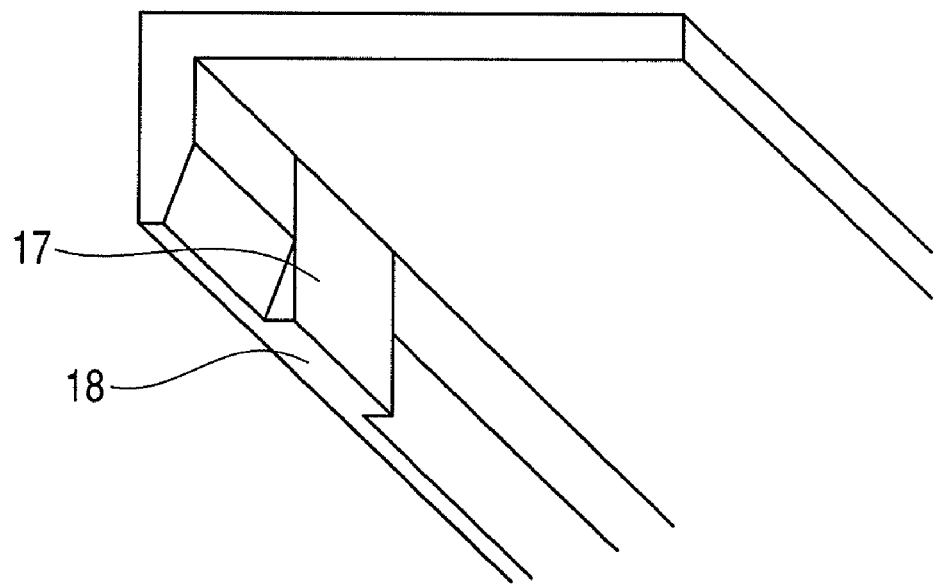
FIG. 10 illustrates the vicinity of a cut surface after a gate is cut off in the embodiment shown in FIG. 9.

FIG. 10 illustrates the vicinity of a cut surface after the gate was cut off in the embodiment shown in FIG. 9. A surface 18 formed by movement of the cutting pin and a compression-purpose thick portion 17, which is opposed to the cutting pin, are illustrated. The surface 18 and the end surface of the product are located at almost the same position by appropriate control of working timing, speed and position of the cutting pin, so that the end surface of the part after the gate cutting was able to have a very beautiful appearance.

Figure 11:
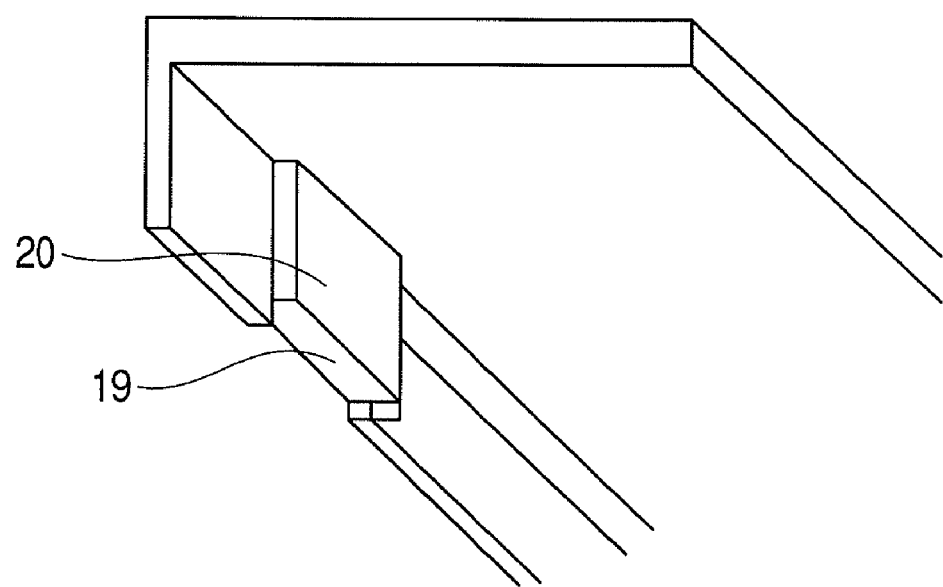
FIG. 11 illustrates another embodiment of the present invention.

FIG. 11 illustrates another embodiment of the present invention. A surface 19 formed by movement of the cutting pin and an end surface 20 of a product is illustrated. In this embodiment, the position of the last stroke of the cutting pin was slightly transferred to the interior of the product from the end surface of the product in the case where the surface 19 was prohibited from protruding from the end surface of the product even slightly from the viewpoint of product function, and good cut surface and compressed surface could be obtained like other embodiments.

Figure 12:
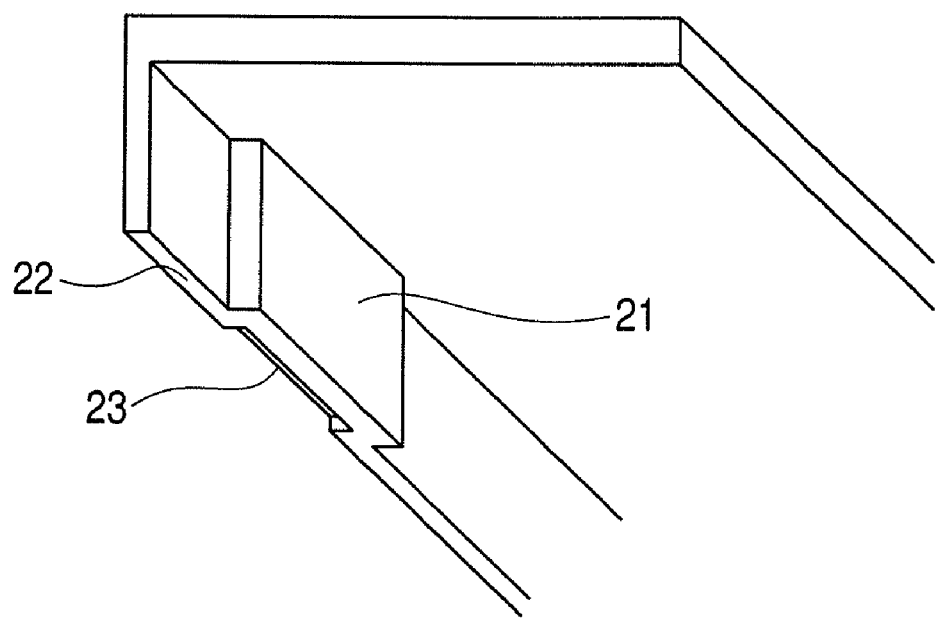
FIG. 12 illustrates a further embodiment of the present invention.

FIG. 12 illustrates a further embodiment of the present invention. A compression-purpose thick portion 21 has a product function as well, an end surface 22 of a product and a surface 23 formed by movement of the cutting pin are illustrated. When a functional portion such as a positioning portion was present in an internal wall portion of the product in the vicinity of a gate, the wall thickness of such a positioning portion was made greater than other portions of the product, and the gate cutting and compressing mechanism according to the present invention was provided at the thick wall thickness portion, whereby good gate cutting and appearance of the gate portion could be achieved. Since the positioning portion in the internal wall is required to be up to the end surface of the product in this embodiment, the wall thickness of the compressed surface by the gate cutting pin was made the same as the wall thickness of the product without making it the entire wall thickness of the thick portion.

Figure 13:
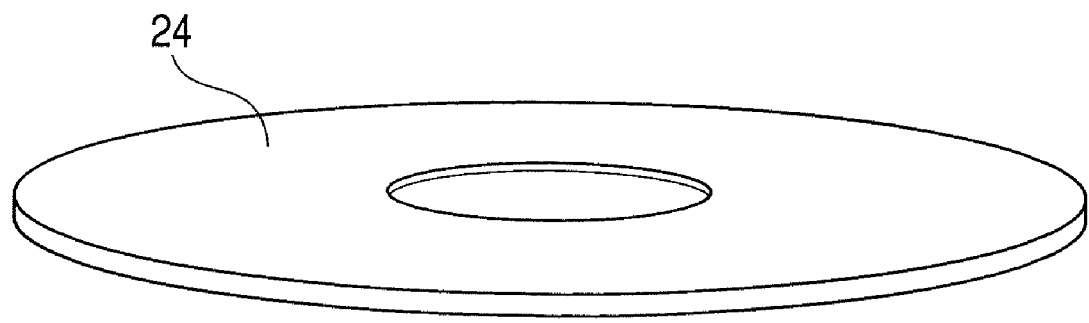
FIG. 13 illustrates an embodiment in which the present invention was applied to a disc-shaped molded product.
Figure 14:
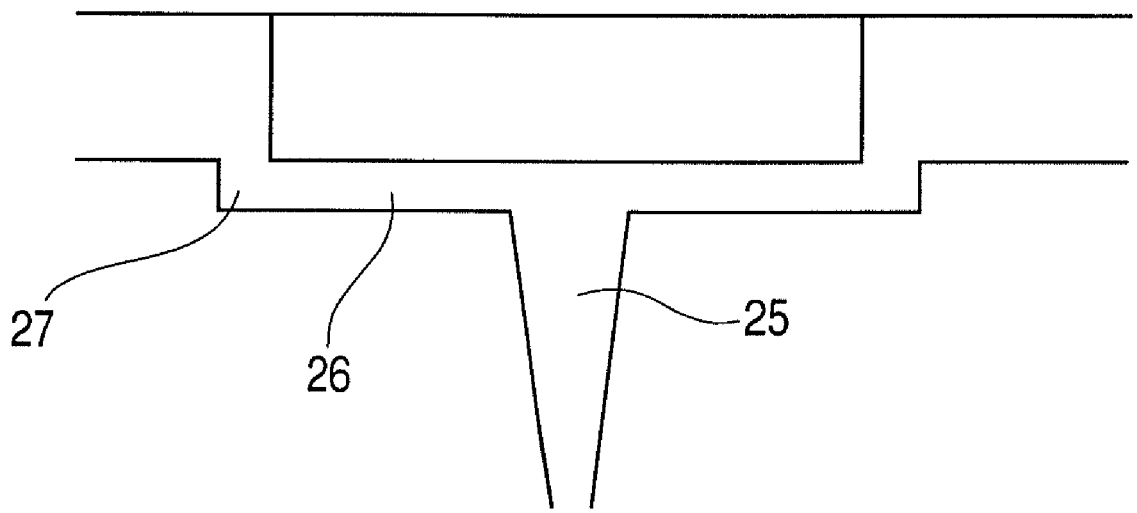
FIG. 14 illustrates, on an enlarged scale, the vicinity of a gate in the applied embodiment shown in FIG. 13.
Figure 15:
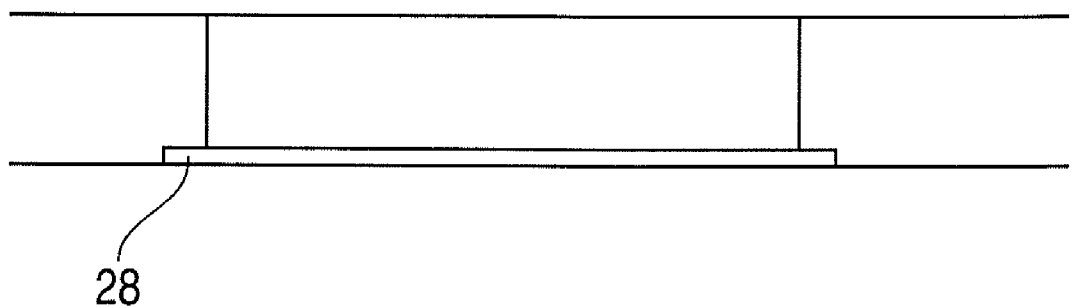
FIG. 15 illustrates a portion in the vicinity of the gate after the gate is cut off in the applied embodiment shown in FIG. 13.

FIG. 13 and FIG. 14 illustrate an embodiment in which the present invention was applied to a disc-shaped molded product such as a CD, DVD or magneto-optical discs. In FIG. 13, is illustrated a disc-shaped molded product 24. FIG. 14 is an enlarged view illustrating the vicinity of a gate making use of the present invention in the disc-shaped molded product, in which a sprue 25, a disc-shaped runner 26 and a thick and compression portion 27 continuously provided on a circumference according to the present invention are illustrated. The cutting pin had a ring shape, and the compression portion 27 could be separated from the disc-shaped runner 26 by operation of the cutting pin at the same time of compressing the compression portion 27. FIG. 15 illustrates a portion in the vicinity of the gate after the gate was cut off, in which a surface 28 formed by movement of the cutting pin is illustrated.

Figure 16:
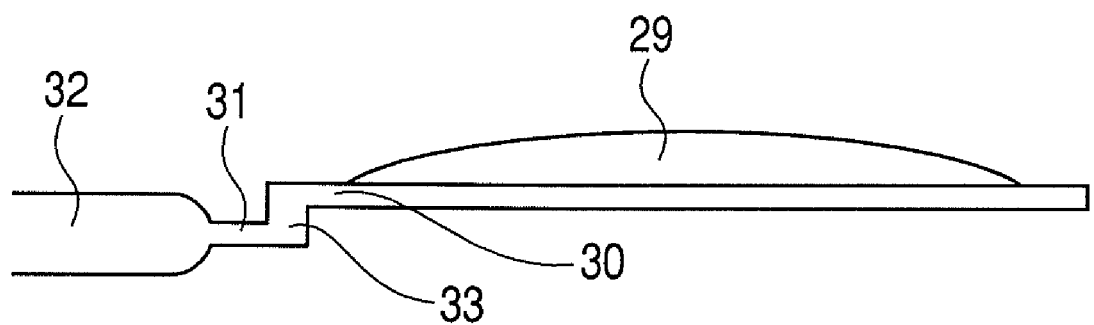
FIG. 16 illustrates an embodiment in which the present invention was applied to molding of a resinous optical lens.
Figure 17:
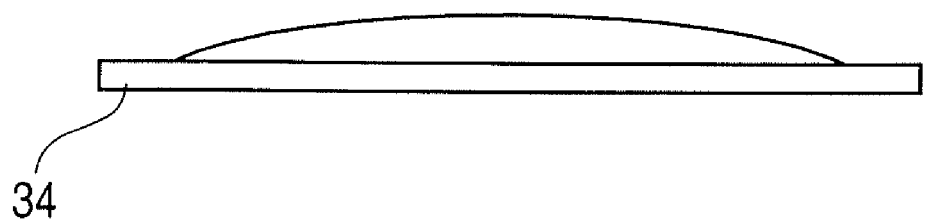
FIG. 17 illustrates a product after a gate is cut off in the embodiment shown in FIG. 16.

FIG. 16 and FIG. 17 illustrate an embodiment in which the present invention was applied to molding of a resinous optical lens. In FIG. 16, are illustrated an optically functioning lens portion 29, a flange portion 30 fitted into a lens barrel upon incorporation of the lens, a thick portion 33 according to the present invention, a gate portion 31 and a runner 32. The gate portion 31 is separated from the flange portion 30 by operation of the cutting pin. FIG. 17 illustrates a product after a gate was cut off, and a surface 34 formed by working of the cutting pin is illustrated. The surface was very smooth. A worker is generally using a heated nipper or the like because light is scattered to adversely affect the optical function when a cut surface after the gate cutting was rough. However, the present invention was performed like the embodiment, whereby a smooth surface could be stably obtained.

Figure 18:
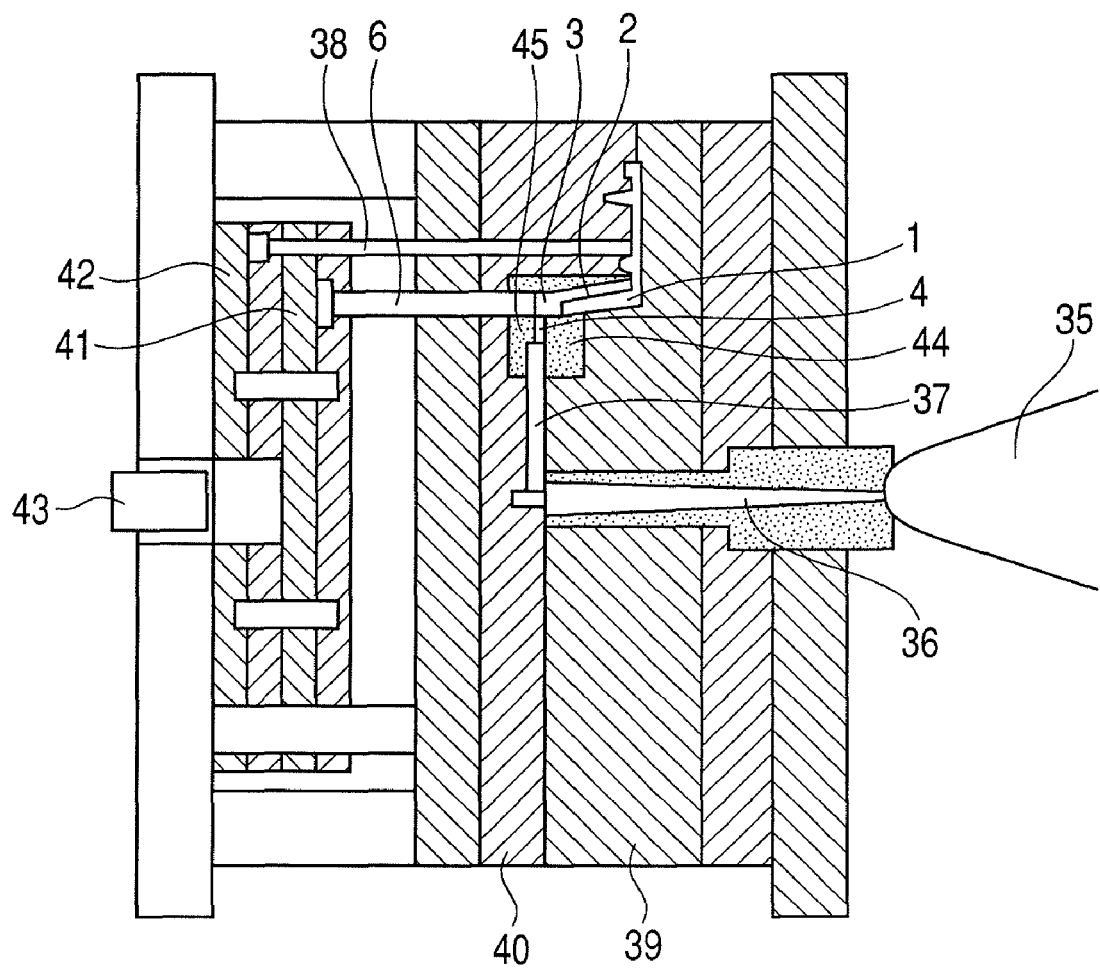
FIG. 18 illustrates the process according to the present invention.
Figure 19:
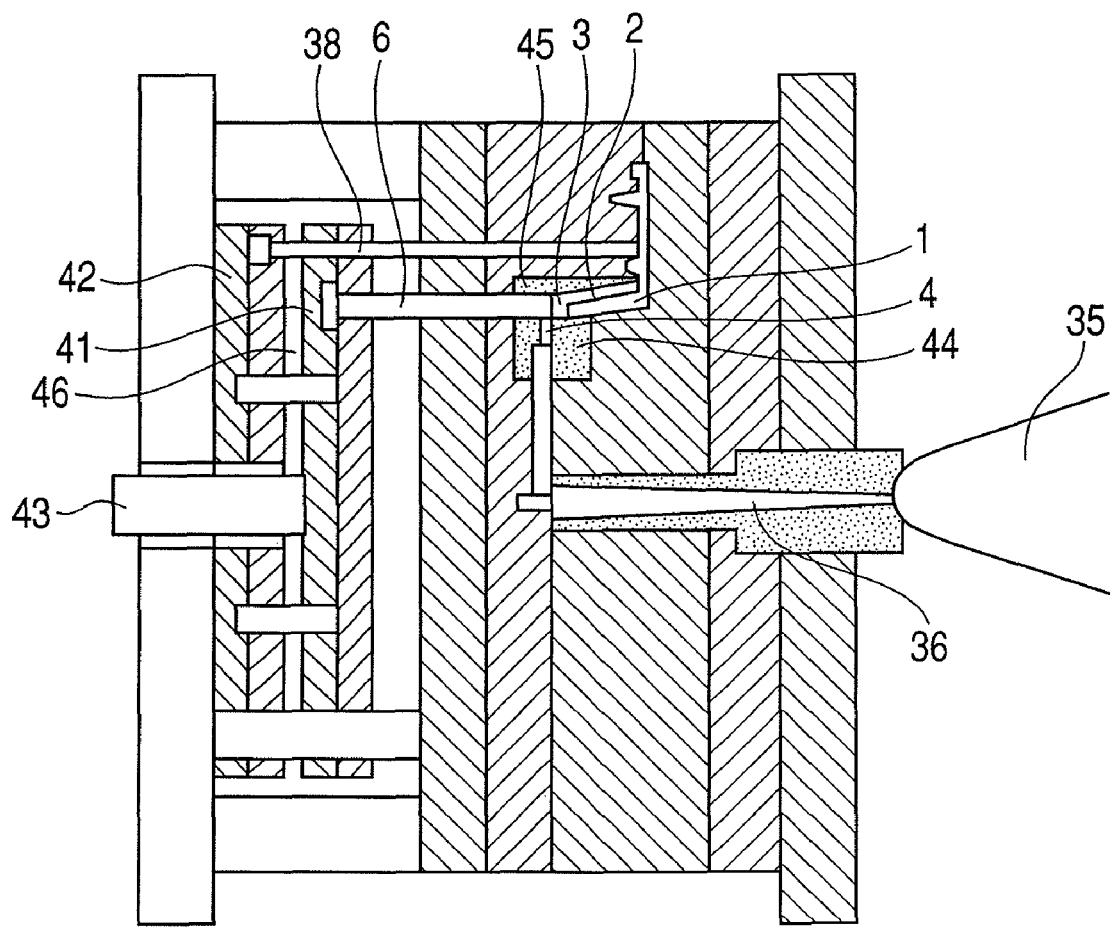
FIG. 19 illustrates the process according to the present invention.
Figure 20:
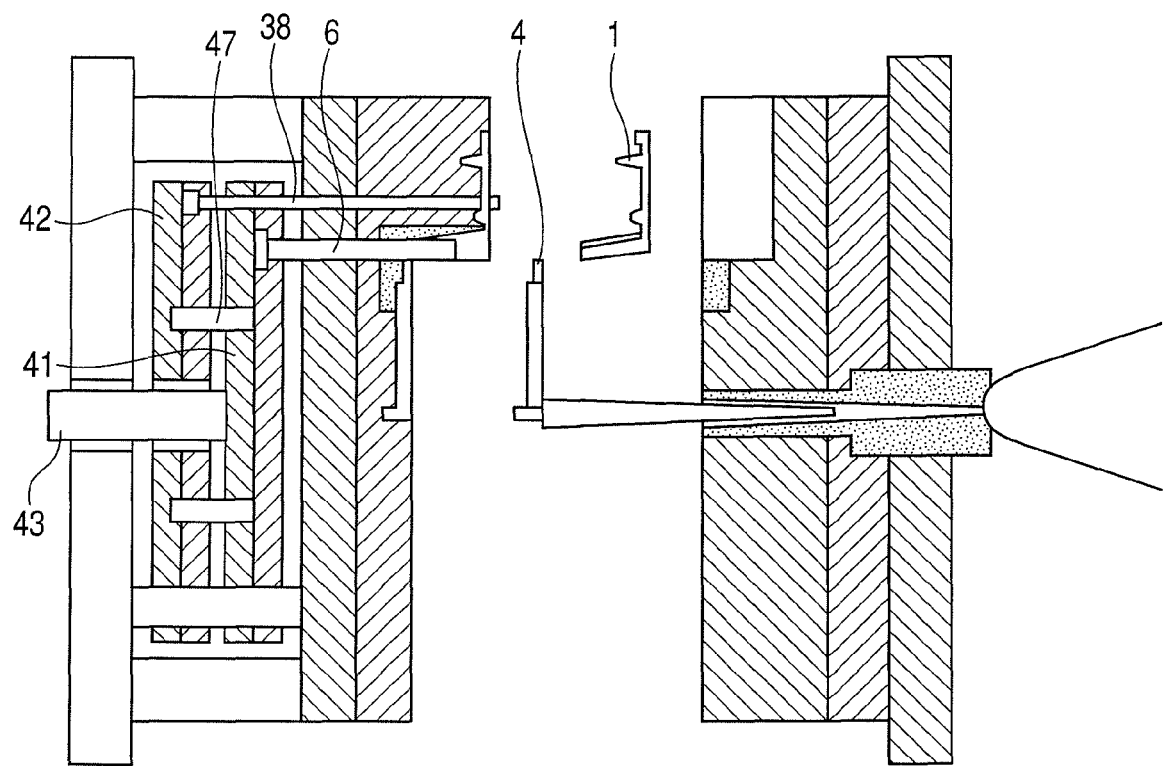
FIG. 20 illustrates the process according to the present invention.

FIG. 18 to FIG. 20 illustrates a process according to the present invention. In FIG. 18, a part shape portion 1 and a compression-purpose thick portion 2 are connected to a runner 37 through a gate 4 and a compression shape portion 3. The runner 37 is connected to a nozzle 35 of an injection molding machine through a sprue 36. In FIG. 18, are illustrated a fixed-side mold plate 39 and a movable-side mold plate 40. A cutting pin 6 is fixed to a cutting pin-working plate 41 and comes into contact with a fixed-side gate insert core 44 and a movable-side gate insert core 45 upon working. An ejector pin 38 is fixed to an ejector plate 42. An ejector rod 43 of the injection molding machine is provided. In FIG. 18, the cutting pin working plate 41 provided in parallel with the ejector plate 42 operates the cutting pin, which is a feature of the present invention. FIG. 19 illustrates a condition just after the gate cutting and compression have been conducted according to the present invention. After completion of the injecting step and pressure holding step, the ejector rod 43, which is a working rod for the molding machine, is moved in a preset movement quantity and at a preset speed to move the cutting pin-working plate 41 connected to the cutting pin 6. By this operation, the cutting pin 6 starts to compress the compression shape portion 3 toward a product shape portion while sliding within the movable-side gate insert core 45, thereby cutting off the gate 4 while compressing the compression shape portion, and enters the fixed-side gate insert core to completely cut off the gate and at the same time to push the compression shape portion 3 into the product shape portion. By these operations of the present invention, the product shape portion could be completely separated from the gate portion within the mold.

FIG. 20 illustrates a product-removed state. As illustrated in FIG. 19, the product shape portion is separated from the gate portion 4 within the mold. When the mold is opened and the ejector rod 43 is worked (advanced), the cutting pin working plate is further advanced, whereby the ejector plate 46 connected to the cutting pin working plate via a connecting plate 47 is advanced. The ejector 38 thereby works to remove the product shape portion (the part shape portion 1 and the compression-purpose thick portion 2) from the mold. The connecting plate connecting the cutting pin working plate to the ejector plate has a stroke control mechanism to permit controlling timing between cutting pin working stroke and working of the ejector.

Figure 21:
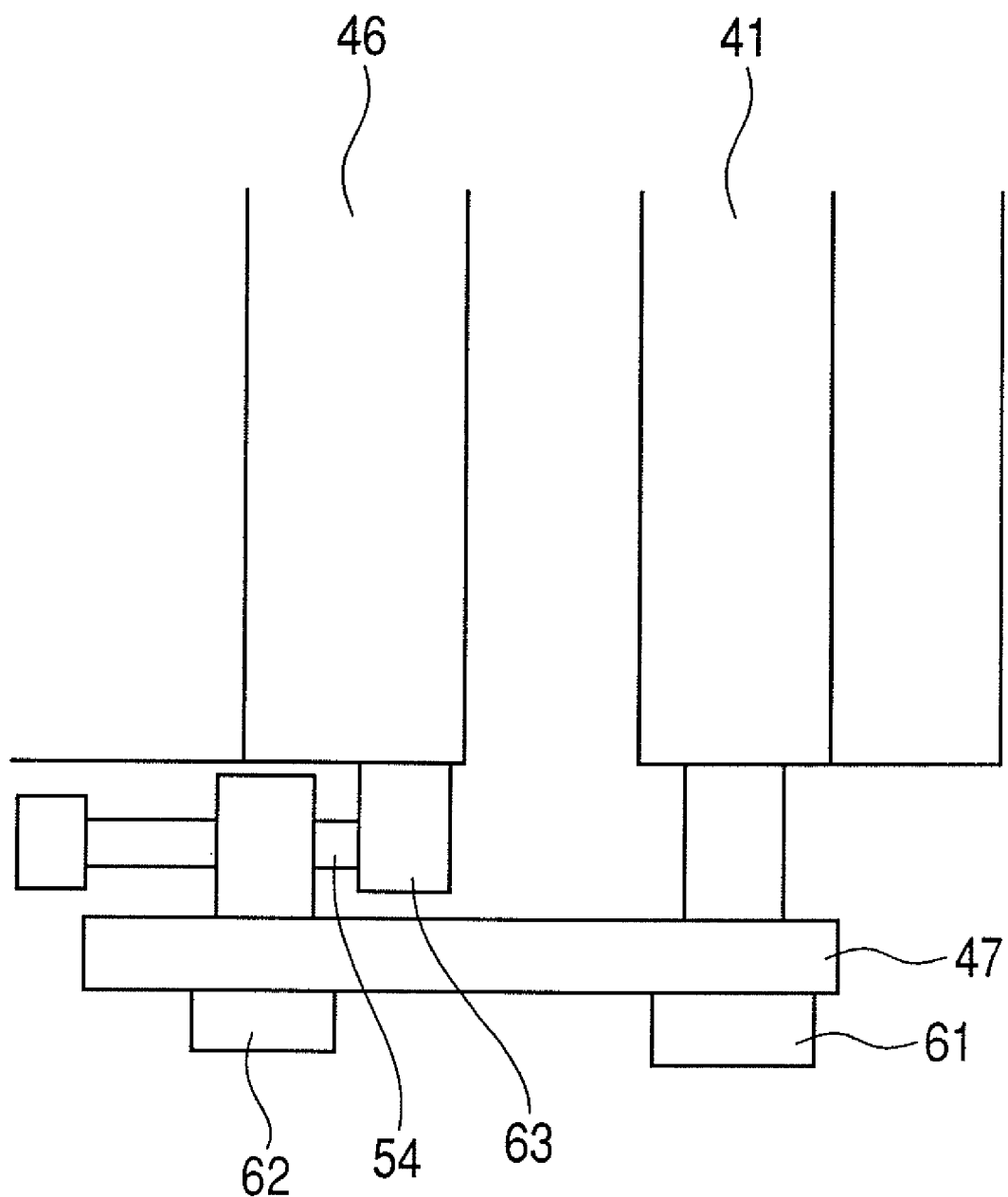
FIG. 21 illustrates an exemplary control mechanism of a connecting plate.

FIG. 21 illustrates an exemplary control mechanism of the connecting plate according to the present invention. The cutting pin working plate 41 is connected to the connecting plate 47 via a connecting pin 61. A control mechanism 54 is fitted to the ejector plate 46 through a control mechanism fitting member 63, and the control mechanism 54 is further connected to the connecting plate 47 via a connecting pin 62. The control mechanism is so constructed that the connecting pin 62 is movably fitted to the control mechanism 54, and the connecting pin 62 strikes the control mechanism fitting member 63 when the cutting pin working plate 41 is greatly advanced, so as to advance the ejector plate 46 while retaining a predetermined interval with the cutting pin-working plate 41. Thus, stroke and timing can be controlled by the length of the control mechanism 54.

Figure 22:
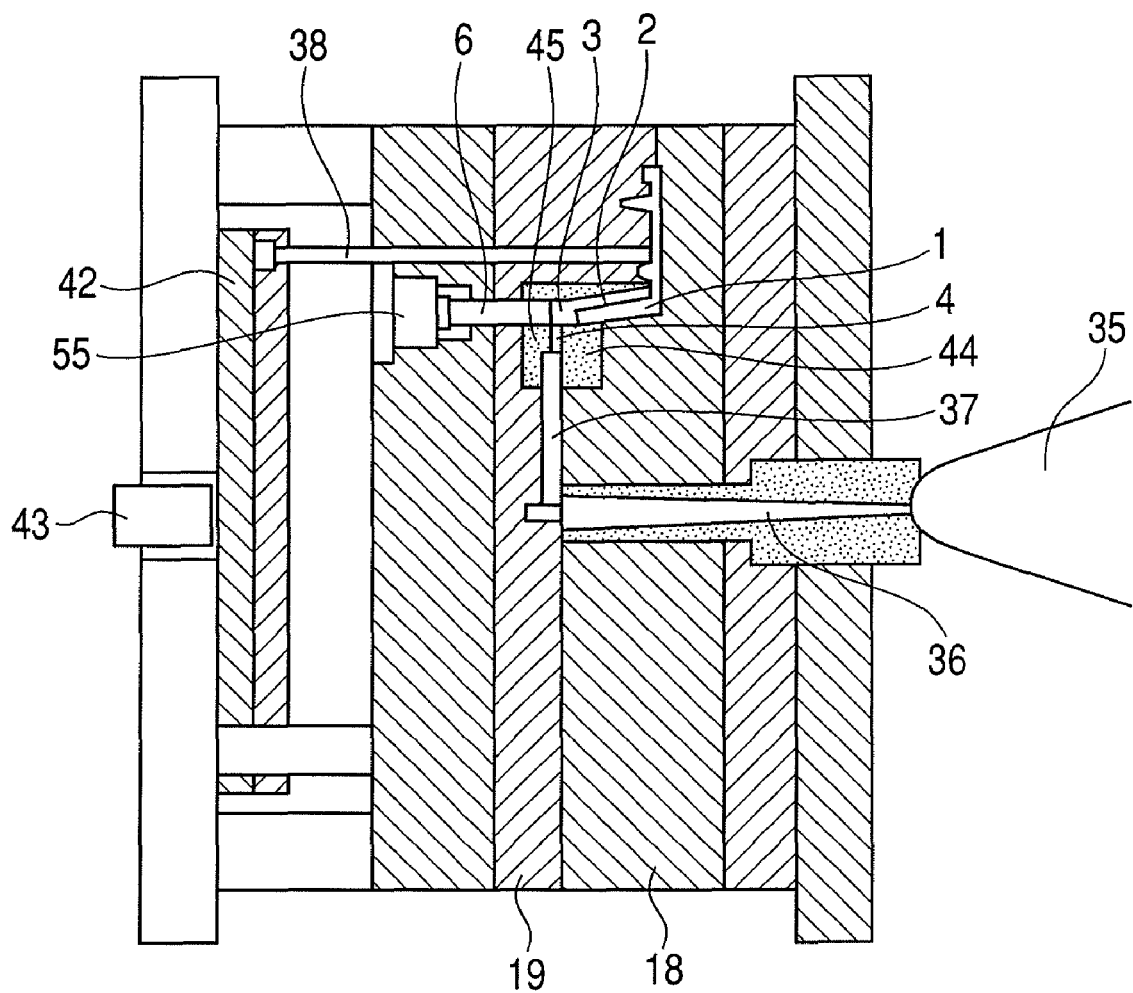
FIG. 22 illustrates an embodiment in which a hydraulic cylinder was installed as a working source of a cutting pin in a mold.
Figure 23:
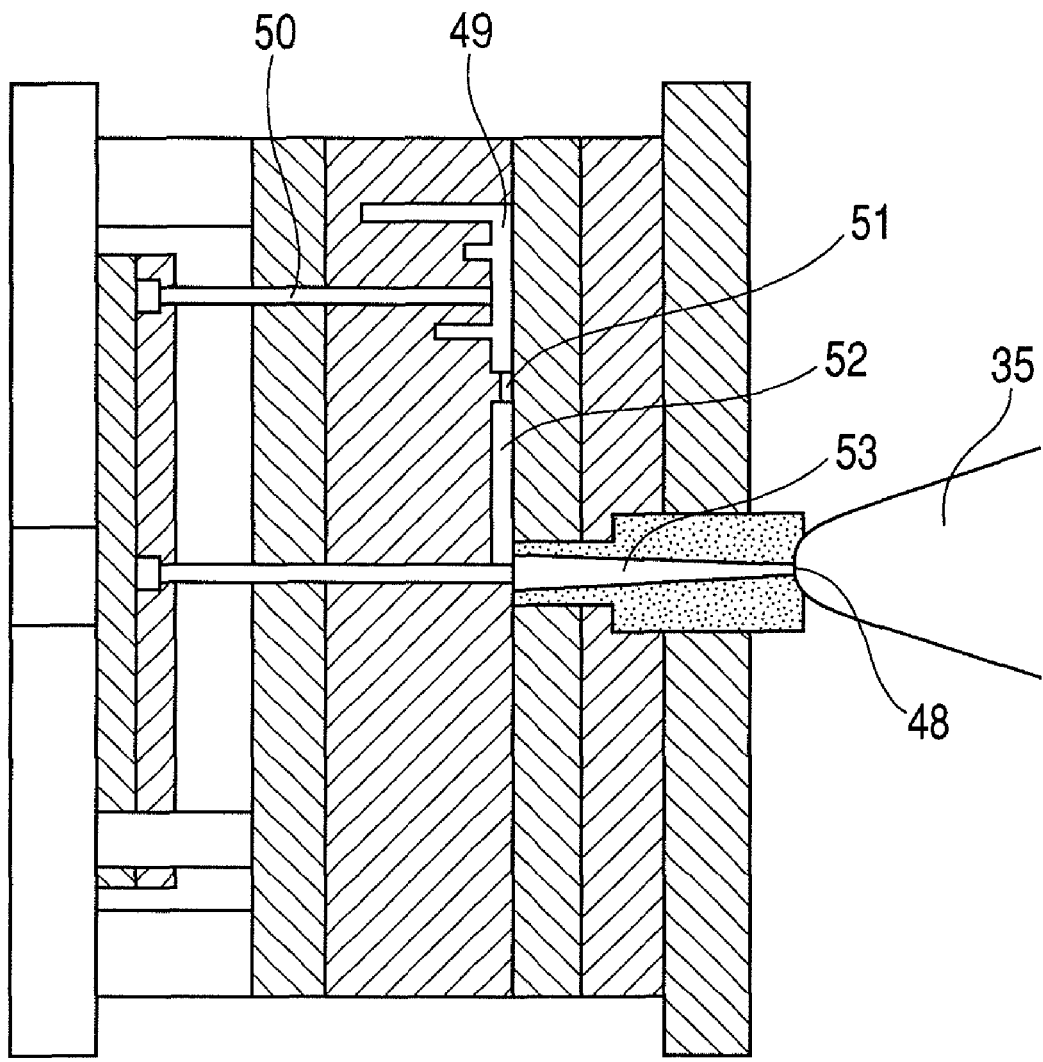
FIG. 23 illustrates a conventional side-gate mold.

FIG. 22 illustrates an embodiment in which a hydraulic cylinder was installed as a driving source of a cutting pin in a mold. In this drawing, a hydraulic cylinder 55 is connected to a cutting pin 6. The hydraulic cylinder 55 is connected to an external hydraulic pressure-generating source (hydraulic pump) and operated by a signal from the injection molding machine.

In the present invention, the compression shape portion for compression, which is a dummy shape having a larger wall thickness than the gate portion and extending from an end surface of a product to the gate, and the compression-purpose thick portion in the product shape portion are newly provided, and the end shape of the cutting pin is a continuous smooth shape engaged with the compression-purpose thick portion. The mold is so constructed that the stroke of cutting is greater than the wall thickness of the gate, and the end of the cutting pin after cutting protrudes on the side of a cavity than the end surface of the gate on the side of the mold cavity to reach the same surface as the product shape. Accordingly, the resin in the gate is cooled and solidified at the time of cutting of the gate and is prevented from flowing backward toward the runner, and the appearance of the resulting part is not deteriorated by the cutting because no cut surface is present at the product shape portion, so that the cut portion continues from the product shape. The gate cutting pieces are provided on both fixed and movable sides so as to hold the gate therebetween, and corner cutting is performed on the edge of the fixed-side gate cutting piece on which the cutting pin advances and slides. Accordingly, the gate cutting pin is prevented from being deformed by the influence of resin pressure or stress upon repeated cutting to cause breakage such as galling with the fixed-side piece. The cutting pin is connected to a cutting pin working device or a mold plate, and the mold plate has such a structure as to work together with the ejector plate beyond a predetermined working range. Accordingly, the mold plate can be controlled by the same operation as in the ordinary working of the ejector by means of an ejector working mode during closing of the mold in the injection molding machine.

According to the present invention, molded products high in productivity and appearance quality can be obtained in the production of a wide variety of resin molded products, such as business and office machines such as printers and copying machines, optical instruments such as cameras and video cameras, and cars using resin parts.

As described above, the present invention greatly contributes to improvement in productivity and quality in resin processing industries in which a resin material is melted and injected into a mold to obtain a resin molded product. In addition, the application and development of the present invention can be not only in molding of resins but also in injection molding of ceramics, die casting of aluminum, sheet forming, and molding and processing of rubber.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-297643, filed Nov. 1, 2006, which is hereby incorporated by reference herein in its entirety.

The invention claimed is:

1. An injection molding process using a resin molding mold having a product shape portion and a gate portion for filling a resin into the product shape portion, comprising the steps of:
    providing a cutting pin which works in a direction of the product shape portion and a compression shape portion between the cutting pin and the product shape portion, the compression shape portion adjoining the gate portion and having a larger wall thickness than the gate portion;
    performing an injecting step of filling a resin into the compression shape portion and the product shape portion from the gate portion followed by solidification of the resin at the gate portion; and
    cutting off the resin at the compression shape portion from the gate portion by operation of the cutting pin and transferring the resin at the compression shape portion to the product shape portion to integrate the resin with the product shape portion.

2. The injection molding process according to claim 1, wherein the product shape portion has a part shape portion and a compression-purpose thick portion having a larger wall thickness than the part shape portion, and wherein the resin in the compression shape portion is transferred to the compression-purpose thick portion by operation of the cutting pin.

3. The injection molding process according to claim 1, wherein the cutting pin is connected to a cutting pin working plate provided in parallel with an ejector plate of the mold, and wherein timing of working of the cutting pin working plate and the ejector plate is controlled by a cutting stroke control mechanism provided at a connecting plate connecting the cutting pin working plate to the ejector plate.

4. The injection molding process according to claim 1, wherein the operation of the cutting pin is conducted in a cooling stage.

5. The injection molding process according to claim 1, wherein the end shape of the cutting pin is of a product shape.

6. The injection molding process according to claim 1, wherein the end shape of the cutting pin is of a flat surface, a curved surface or a combined shape thereof.

7. A resin molding mold comprising:
    a product shape portion,
    a gate portion,
    a cutting pin which works in a direction of the product shape portion, and
    a compression shape portion provided between the cutting pin and the product shape portion, the compression shape portion adjoining the gate portion and having a larger wall thickness than the gate portion,
    wherein the product shape portion includes a part shape portion and a compression-purpose thick portion, the compression-purpose thick portion having a larger wall thickness than the part shape portion and becoming engaged with the end portion of the cutting pin by the working of the cutting pin.

8. The resin molding mold according to claim 7, further comprising pieces, which form the gate portion and are provided on both fixed side and movable side, and on which the cutting pin slides, wherein a tapered surface or a R surface is provided at a cutting pin approach port of the piece provided on the fixed side.

9. The resin molding mold according to claim 7, wherein the end shape of the cutting pin is of a flat surface, a curved surface or a combined shape thereof.

10. The resin molding mold according to claim 7, wherein the cutting pin is connected to a cutting pin working plate provided in parallel with an ejector plate of the mold, and wherein the cutting pin working plate is worked by a rod for working an ejector.

11. The resin molding mold according to claim 10, further comprising a connecting plate connecting the cutting pin working plate to the ejector plate and a stroke control mechanism provided at the connecting plate.

12. The resin molding mold according to claim 7, wherein a driving device provided in the mold works the cutting pin.

* * * * *